No. 867,202. PATENTED SEPT. 24, 1907.
D. H. KENDALL.
PROCESS OF MAKING STIFFENING FOR SUNBONNETS AND THE LIKE.
APPLICATION FILED APR. 22, 1907.
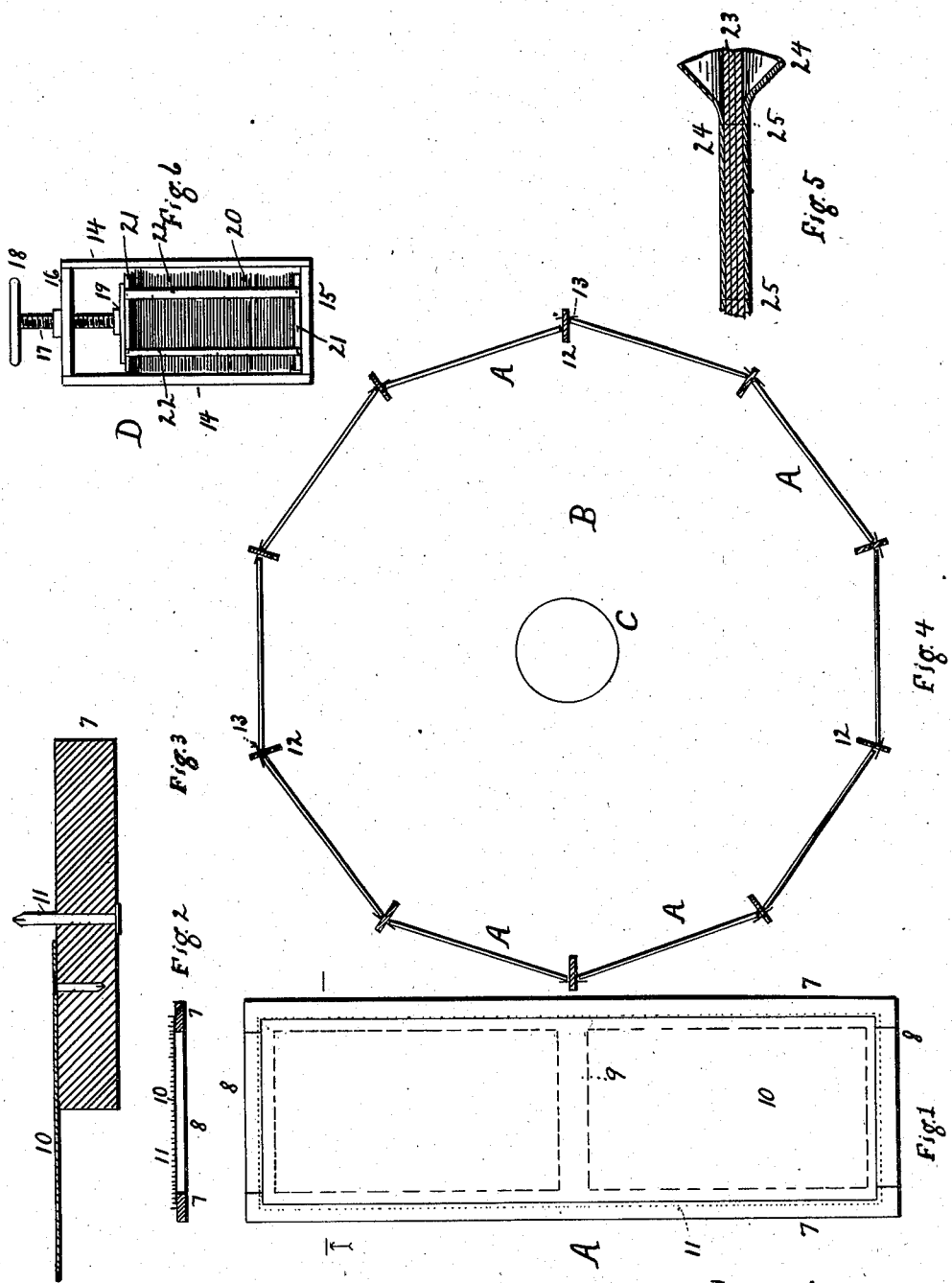
Witnesses
Z. T. Fisher
E. Rosen
Inventor
David H. Kendall
By J. A. Rosen Atty

UNITED STATES PATENT OFFICE.

DAVID H. KENDALL, OF LATHROP, MISSOURI, ASSIGNOR TO AMERICAN SUN BONNET COMPANY, OF LATHROP, MISSOURI, A CORPORATION OF MISSOURI.

PROCESS OF MAKING STIFFENING FOR SUNBONNETS AND THE LIKE.

No. 867,202.  Specification of Letters Patent.  Patented Sept. 24, 1907.

Application filed April 22, 1907. Serial No. 369,677.

*To all whom it may concern:*

Be it known that I, DAVID H. KENDALL, a citizen of the United States, residing at Lathrop, in the county of Clinton and State of Missouri, have invented new and useful Improvements in the Process of Making Stiffenings for Sun Bonnets and the Like, of which the following is a specification.

The invention relates to the mixture of certain ingredients as a paste, the application of the paste to two or more thicknesses of muslin or other suitable cloth, and the subjecting of the product to a treatment whereby it is rendered pliable and otherwise suited as stiffenings for sun-bonnets, sun-hats, coats and coat lapels, wearing apparel, and the like.

Objects are to provide a suitable stiffening for sun-bonnets and the like; to provide a stiffening which is not affected by changes in the weather, and which will not warp or blister in any climate; to provide such a stiffening which may afterwards be washed and ironed, with the covering attached, and without wrinkling the covering or warping or blistering the stiffening; and to provide a simple process of making such stiffenings.

The further nature and objects of the invention will appear hereinafter.

In the accompanying drawing, I have illustrated a system of apparatus whereby the invention is utilized; but it is to be understood that I do not intend by such illustration to confine myself to the use of this particular apparatus; also I have explained in this specification the principles of my invention and what I deem to be the best mode of applying the principles thereof; but it is to be understood that I contemplate changes in form, proportions, materials, and the substitution of equivalent members, steps, and ingredients, without departing from the spirit of the invention.

Figure 1 is a top view of the drying board. Fig. 2 is a cross section thereof; and Fig. 3 is an enlarged sectional view showing in detail the manner of making the board. Fig. 4 is a plan view of diagram showing the method of setting these boards in a circle around a heating apparatus, as a stove. Fig. 5 is an enlarged sectional view of the stiffening with the coverings attached. Fig. 6 is a side elevation of the screw press for pressing the stiffenings together after having been cut up in the smaller and proper-sized pieces.

Like reference letters and numerals indicate like or corresponding parts throughout the several views.

As a paste I use the following ingredients and method of mixing same: Dissolve about one pound of pure alum in about ten gallons of cold water, which may be done by leaving the alum in the water over night, or for about twelve hours, or by any other suitable method. With about two quarts of flour made from soft winter wheat and a sufficient amount of the alum water, make a stiff batter, using only enough of the cold alum water to secure a thorough mixing and breaking up of the lumps. Then reduce to the consistency of ordinary thick cream by the addition of more of the cold alum water. Place this mixture in a kettle or other suitable vessel and add about one and one-half gallons of boiling alum water, stirring and cooking same until it forms a nice smooth paste. This makes about two gallons of the paste as it is to be used on the cloth. The paste should be used while still warm. I prefer the soft winter wheat flour, because it retains its proper consistency as a paste, whereas other kinds of flour tend to separate from the water after standing for even a short time. The purpose of the alum will be explained hereinafter.

As a drying board, I use a piece of galvanized sheet-iron 10, about three feet wide and ten feet long, tacked onto a frame work made up of strips of wood, 7, 8, 9, and extending beyond the outer edges of the sheet-iron. A row of pins 11, 11, project upwardly from the outer edge of the board, and they may be provided in a very easy manner by driving nails through the wooden strips of the frame work, as shown in Fig. 3.

As a base for the stiffening, I prefer to use unbleached muslin of the quality known as "C" muslin, as it is the cheapest on the market adapted for this purpose. Obviously, however, bleached muslin, or other grades of muslin, or other goods might be used as well, though perhaps not so economically. The muslin is cut up into strips, about three feet wide and ten feet long. A strip of the muslin is laid out on the drying board, its outer edges being caught on the pins or nails 11, so that it is thoroughly stretched and held tightly on the board. Now, on this strip of muslin spread out evenly, as with a brush, about one-half of the two gallons of paste prepared as above set forth. Then on top of this coating place another strip of the muslin; and then spread out evenly on top of this second strip the balance of the two gallons of paste. Then add the third strip of muslin, and brush well down and into the paste, so that the three strips of muslin and the two applications of the paste will adhere closely and thoroughly. The paste, of course thoroughly soaks through the entire three strips of muslin. And thus it causes the stiffening to stick to the drying board. The drying board should be quite smooth, the use of the galvanized sheet iron insuring the requisite smooth surface. After several of these boards have been prepared, as just described, they are dried, and preferably in the following manner: Place a number of them, on end, in a circle around a stove C (Fig. 4), which may be easily done by erecting them between the upright studdings 12, 12, and holding them in place by pins 13, 13. Here the boards should remain for a sufficient length of time to thoroughly dry them, usually twenty-four hours, at a temperature of say from 120 to 150 degrees. By this method of arranging the boards around the stove, they are uniformly and thoroughly dried. By reason of being attached to the pins 11, 11, around the edges, and by reason of sticking to the board itself, the stiffening becomes dried without warping, or shrinking, and when dried, it is quite hard and stiff. However, as it comes from the drying board, it is too hard and stiff for the purpose of a sun-bonnet stiffening, and to season it and make it pliable, I use the method now to be described. The entire sheet of stiffening may be marked off into suitable shapes and sizes, according to the use to which it is to be put, and may be taken from the drying board by lifting it up at the edges and pulling it off, the pins allowing this without tearing by reason of their projecting out straight from the board. When cut up into the proper shapes for sun-bonnets, for instance, I place several hundred of these stiffenings in a press, with only a moderate pressure being necessary, to lay them out straight and flat. A simple form of press is shown in Fig. 6. It may comprise top and bottom plates 16 and 15, tie rods 14, 14, a pressure screw 17, handle 18, pressing head or plate 19. The several stiffenings may be placed in this press between two boards 21, 21; the handle may then be operated to get the desired pressure, and while in the compressed state, a number of strips 22, 22, may be nailed to the top and bottom boards 21, 21, so as to form a sort of bale. This bale may be then removed from the press and set aside, thus by a simple method, holding the stiffenings under pressure for as long a period as may be desired. This period of seasoning ought to be at least two weeks, although a month is more desirable. After being duly seasoned the product is taken from the bales, flat, straight, very pliable, without hardness and without any tendency to warp. Before using the stiffening in the sun-bonnet, it is preferably placed in an oven at a very moderate temperature to drive out whatever moisture may remain.

In using this stiffening in sun-bonnets, it is usually covered with some finishing goods, as gingham, percale, or other suitable material, and this may be sewed to it on both sides by the ordinary quilting method. In Fig. 5 I have shown the stiffening comprised of three layers of muslin and two coats of the paste, 23, with the coverings 24, 24 sewed thereto, as at 25, 25. It is to be noted that this product is not ironed or laundered during the process of its manufacture; yet the finished product is of proper stiffness and pliability to be used in sun-bonnets and other wearing apparel. It will not warp or "blister" in any climate, and it will not be affected by changes in the weather.

After being made up into sun-bonnets, or other wearing apparel, the bonnet may be washed and ironed whenever necessary or usual in domestic use, and with the addition of starch it may be again stiffened. It is an important feature of this stiffening, however, that when so washed and ironed, the outer coverings, as well as the several layers of the stiffening itself, all adhere closely, so that they may be ironed out smoothly, without warping, blistering, or wrinkling, or stretching; whereas, with other materials, it is impossible to iron out the bonnet smoothly.

The use of the alum is at least for two purposes, first, it aids in thoroughly seasoning the stiffening, so as to prevent warping and blistering, and second, it serves to drive off the mice, and other vermin, the bonnets containing this material being practically mouse-proof. Without the use of the alum, or an equivalent ingredient, there is always a tendency of the stiffening to warp or blister, and to stretch and wrinkle on being ironed.

I have here described the stiffening as made up of three thicknesses of muslin; but it will be understood that is merely a preferred number, as there may be more or less according to the requirements of the circumstances.

What I claim is:

1. The process of making a stiffening, consisting of pasting together a number of layers of cloth of muslin quality with a paste made of flour and water and alum, drying same while it adheres to a smooth surface on one side, the other side being exposed for the free vaporization of the moisture, and then seasoning the dried product by subjecting several layers thereof to moderate pressure for a suitable period to render same pliable.

2. The process of making a stiffening, consisting of pasting together a number of layers of cloth of muslin quality with a paste made of flour and water and alum, drying same while it adheres to a smooth surface on one side, the other side being exposed for the free vaporization of the moisture, then seasoning the dried product by subjecting it to pressure for two weeks or longer, then again finally and thoroughly drying the seasoned product, and then covering the product with a suitable covering cloth.

3. The process of making a stiffening, consisting of pasting together a number of layers of muslin with a paste made of flour and water and alum and thoroughly worked into the fabric, then drying same while it adheres to a smooth surface on one side, the other side being exposed so as to permit the free vaporization of the moisture, then seasoning the dried product by subjecting it to pressure for a suitable period, then again finally and thoroughly drying the seasoned product, and then sewing to the product a suitable covering cloth.

4. The process of making a stiffening consisting of pasting together a number of layers of cloth of suitable quality with a paste made of flour and water and alum, drying same while it adheres to a smooth surface on one side, other side being exposed for the free vaporization of the moisture, and then seasoning the dried product by subjecting several layers thereof to pressure for a suitable period to render same pliable.

5. The process of making a stiffening consisting of pasting together a number of layers of cloth of suitable quality, drying same while it adheres to a smooth surface on one side, the other side being exposed for the free vaporization of the moisture, and then seasoning the dried product by subjecting it to moderate pressure for a suitable period.

In testimony whereof I have hereunto set my hand in the presence of the subscribing witnesses.

DAVID H. KENDALL.

Witnesses:
L. C. COLLVIN,
JOE T. DOHERTY.